Sept. 15, 1953     R. B. LAWRENCE     2,651,924
DUSTPAN
Filed Jan. 7, 1949
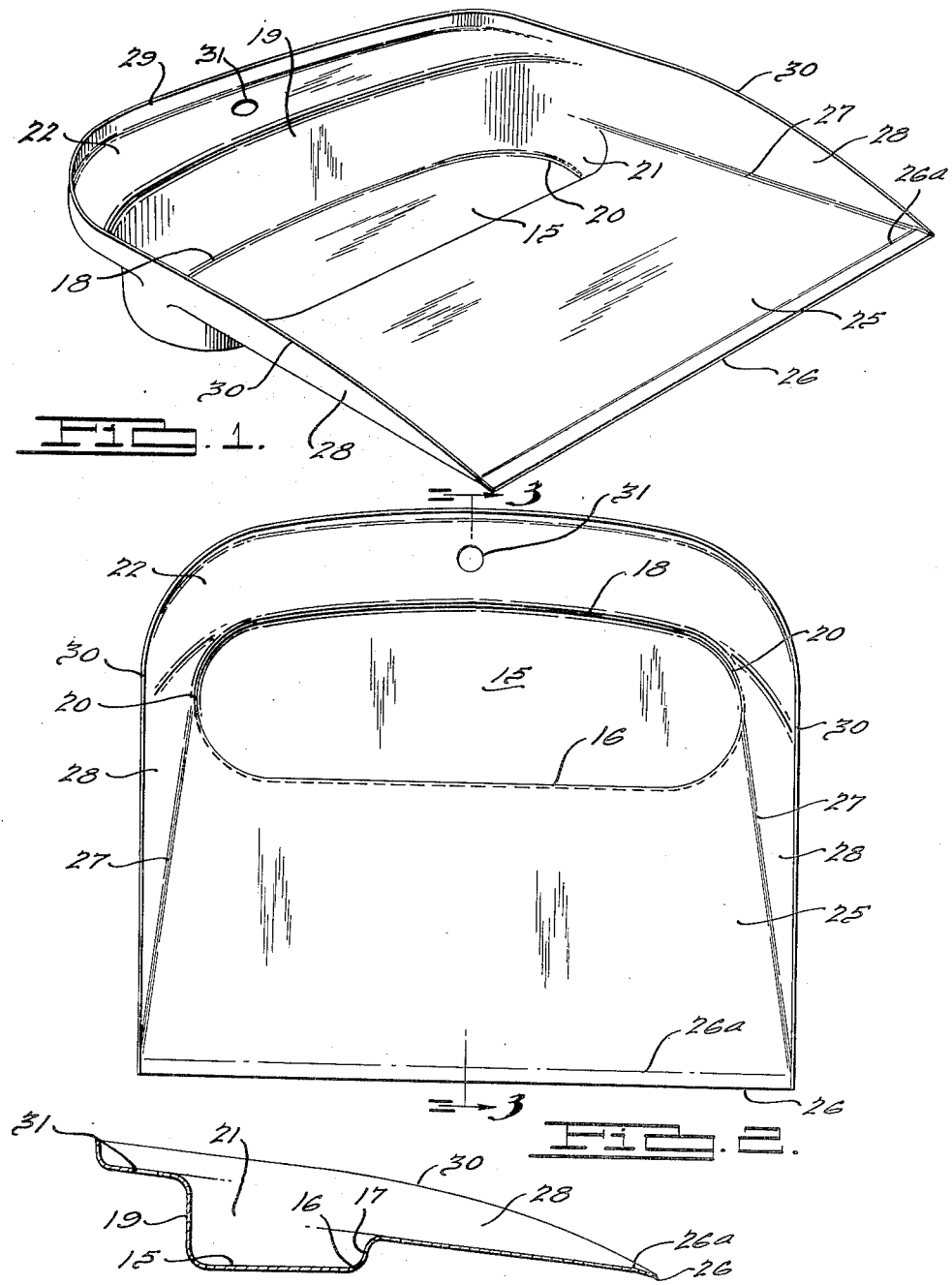
INVENTOR.
Richard B. Lawrence.
BY
Gregory S. Dolgorukov
ATTORNEY.

Patented Sept. 15, 1953

2,651,924

UNITED STATES PATENT OFFICE 2,651,924

DUSTPAN

Richard B. Lawrence, Detroit, Mich.

Application January 7, 1949, Serial No. 69,743

3 Claims. (Cl. 65—20)

This invention relates to receptacles and more particularly to an improved dust pan.

One of the objects of the present invention is to provide an improved dust pan which is convenient to use for the purposes intended, and in which the disadvantages common to conventional dust pans are overcome and largely eliminated.

Another object of the invention is to provide an improved dust pan of such a construction and such distribution of weight that while the pan is relatively light, its dust-receiving lip or edge rests firmly on the floor without rising or rocking and permitting the dirt to get under the pan.

A further object of the invention is to provide an improved dust pan which need not be held by one hand while the other hand is used to operate the broom, but which can be merely placed on the floor and held against one foot, if desired, thus permitting use of both hands for operating the broom, and enabling the user to hold the broom firmer and to sweep cleaner.

A still further object of the invention is to provide an improved dust pan having a dirt-receiving depression or pocket which can be formed easily by stamping without tearing the material of the blank and yet which does not contribute to undesirable weight distribution causing rocking of the pan when placed on the floor, as is the case with pans having dirt-receiving pockets including curvature of a large radius.

A still further object of the invention is to provide an improved dust pan having a handle which can be grasped with a more natural and easy use of one's hand, which handle does not produce undesirable over-balancing of the lip portion of the pan, and which is formed integrally with the dust pan body.

A still further object of the invention is to provide an improved dust pan of the foregoing character which is of such construction and has such an arrangement of its various parts as to be susceptible of making as a one piece article and in a single stamping operation by ensuring easy and proper flow of the material in the forming stage of said stamping operation.

It is an added object of the present invention to provide an improved dust pan of the foregoing character which while being convenient to use, is light, strong, sanitary in use, and relatively inexpensive to manufacture.

Other objects of this invention will appear in the following description and appended claims, reference being had to the accompanying drawings forming a part of this specification, wherein like reference characters designate corresponding parts in the several views.

Fig. 1 is a perspective view illustrating a dust pan embodying the present invention.

Fig. 2 is a top view of the dust pan of Fig. 1.

Fig. 3 is a sectional view taken in the direction of the arrows on the section plane passing through the line 3—3 of Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In describing the dust pan embodying the present invention, the dirt-receiving edge or lip of the pan is considered for the purposes of description as the front, and the handle as the rear of the pan. The terms "upper" and "lower" are used with reference to pan portions correspondingly disposed when the pan rests flat on a straight horizontal surface.

In the drawings there is shown, by way of example, an improved dust pan embodying the present invention. The improved dust pan illustrated therein comprises generally, a dirt-receiving receptacle, an inclined ramp leading from the floor surface into the receptacle and provided along its edges with dirt-directing flanges converging toward the receptacle, a handle flange formed integrally with the dust pan along the dirt-receiving receptacle, and a thumb flange provided on the handle flange. All of the above parts of the dust pan are formed integrally and merge smoothly and seamlessly into one another. The curvature at their places of juncture and their mutual arrangement or disposition, hereinafter described in detail, are such as to ensure their proper functional cooperation, as well as easy and uninterrupted flow of the metal in the process of forming the dust pan making it susceptible of being made by a single stamping operation, with both the forming and the trimming being completed during a single stroke of a single acting press.

Referring to the drawings, and particularly to Figs. 1–3 thereof, the dust pan shown therein comprises an elongated dirt receptacle having a flat bottom 15 surrounded with upstanding walls. Said walls are made to converge downwardly to effect better reception of dirt as well as to provide the necessary draft to facilitate stamping. The front edge 16 of the bottom 15 is substantially straight and it merges into the front wall 17 of the receptacle, while the rear edge 18 is of an arcuate form and it merges with the back wall 19. The end edges 20, 20 of the bottom 15 are substantially semi-circular in form, and they merge into the end walls 21, 21 of the receptacle. It is preferable to use a rather liberal curvature at the places of juncture of the bottom 15 with the surrounding walls, arcs having radius of three eighths of an inch being preferred.

The rear wall 19 of the receptacle is considerably higher than the front wall 17 in order to provide a proper stop for the broom and thus prevent soiling of the handle flange 22 provided along said wall 19 and merging therewith. The wall 19, three times as high as the wall 17, gives very satisfactory performance.

In front of the wall 17 there is provided an inclined ramp 25 having a rear edge merging with the wall 17 and with the end walls 21, 21 of the receptacle. The front edge 26 of the ramp 25 is straight and it provides a dirt-receiving lip. Said edge lies in the plane of the bottom 15 in order to ensure its tight contact with the floor when the dust pan is placed on the floor. A bend such as shown at 26a along a line parallel to the edge 26 is provided to stiffen the edge. It is preferable to have the ramp 25 and the handle 22 to lie in parallel planes.

The side edges 27, 27 of the ramp converge toward the dirt receptacle and merge with ramp flanges 28, 28. Each of the flanges 28, 28 comes substantially to a point at the lip 26 and gradually increases in height toward its rear ends which merge into the end wall 21 of the receptacle, handle flange 22 and the upstanding thumb flange 29 provided around the outside edges of the handle flange 22. By virtue of such a construction a continuous upper edge is provided around the entire dust pan, merging with the lip 26 and adapting the tray to very easy and smooth trimming operation. It may be desirable to impart to the upper edges of the flanges 28, 28 a curvature of pleasing appearance, such as indicated at 30, 30. The flanges 28, 28 diverge upwardly for better reception of the broom, and in the present embodiment they form between themselves an included angle of appr. 60 degrees near the lip 26, said angle slightly increasing toward the dirt receptacle to effect smoother juncture with the handle flange 22 in forming.

A hole 31 is provided in the flange 22 for hanging the dust pan on a nail or a hook on the wall, as well as for suspending it on plating or painting, if required.

I prefer to make the dust pan of such dimensions that the ramp and its flanges receive a broom of most common width and permit moving the same to the dirt receptacle back wall 19 without turning the broom first one way and then the other. The wall 19 should also be high enough to ensure that the handle flange 22 is disposed in the operation position of the pan at a sufficient distance from the floor to permit taking hold of it without touching the floor.

All of the above described elements of the dust pan construction merge smoothly and seamlessly into one another. When they form an angle, an arc of a liberal radius should be formed at the places of such a juncture. However, at the places of juncture of the ramp 25 and flanges 28 a relatively sharp corner may be used.

By virtue of the above described construction and arrangement of its parts, my improved dust pan may be made, even from such materials as sheet steel, in a single stamping operation, both its forming and trimming being accomplished during one stroke of a single acting press, with the use of die apparatus.

It will now be seen in view of the foregoing when my improved dust pan is placed on the floor, it rests flat and firm thereon without any rocking, thus ensuring that the lip 26 is always in close contact with the floor, and the dirt does not get under the pan. Such desirable operation of the dust pan constructed in accordance with the present invention results, in part, from the provision of the flat bottom in the dirt receptacle and such distribution of weight that in spite of the light weight of the pan it takes application of a considerable force to raise the lip 26 from the floor, which force is greater than the forces usually produced by the broom in sweeping the dirt into the dirt receptacle.

By providing a relatively wide approach to the dirt receptacle my improved dust pan ensures that the entire quantity of dirt carried by the broom falls into the receptacle when the broom is brought over it, and it does not remain in its large part on the ramp to be carried back by the broom as is the case with many conventional dust pans, wherein the broom has to be disposed diagonally of the ramp in order to enter between the ramp side flanges.

With the conventional constructions having dirt receptacles with curved bottoms, and provided with long handles, the pan is usually so nearly balanced that a slight touching of the pan on its handle side causes very annoying rocking of the pan. Therefore, with such conventional pans it is usually necessary to hold the pan by its handle with one hand pressing the dirt receiving lip against the floor and operate the broom with another hand. A conventional broom is entirely too heavy for such an operation; moreover it is necessary to bend down for a relatively long time until all of the dirt is swept clean into the pan. Such use of the pan is not only annoying and inconvenient, but causes dizziness and may be injurious to health of many users.

With my improved dust pan, after the dirt is swept into a small pile on the floor, the pan is simply placed near it, and the dirt is swept into the pan with a broom held in both hands and without bending down while sweeping. If necessary one foot may be placed against the handle flange 22 to prevent sliding of the pan. Thereupon the pan is picked up by the handle flange and contents shaken out into a pail or a similar receptacle. It should also be noted that holding the pan by the handle flange 22 ensures more natural hold without the necessity of twisting the arm at the wrist at 90 degree angle, as required with conventional handles.

It can also be appreciated that elimination of conventional handle made my improved dust pan more compact and easy to store both in use and in manufacture. Moreover, in packing my improved dust pans in large quantities for shipment they may be stacked up one into the other and thus will occupy a very limited space.

By virtue of the above objects of the invention as listed above, numerous incidental advantages are attained.

I claim:

1. A dust pan made by stamping from a single piece of sheet material, said pan including a dirt-receiving pocket having a flat bottom adapted to rest flat on the floor and walls surrounding said bottom from all four sides thereof and merging smoothly and seamlessly therewith, a horizontally extending flange merging smoothly and seamlessly with the back wall and adapted to be used as a handle for the dust pan, and an upstanding thumb flange provided along the edges of said horizontally extending flange.

2. A dust pan made by stamping from a single piece of sheet metal, said dust pan including a dirt-receiving pocket having a flat bottom adapted to rest flatly on the floor and walls surrounding said bottom from all sides thereof and merging smoothly and seamlessly therewith, an inclined ramp merging smoothly and seamlessly with the front and side walls of said dirt-receiving pocket and terminating in a floor-contacting lip, a horizontally extending flange provided along the back wall of said pocket and merging smoothly and seamlessly therewith, said flange being adapted to be used as a handle for the dust pan, and inclined side flanges provided along the sides of said ramp and having front ends terminating at said floor-contacting lip, the rear ends of said side flanges merging smoothly and seamlessly with the upper portion of said back wall of the dirt-receiving pocket and said horizontally extending flange, said horizontally extending flange being turned up at its back and edges to form an upward thumb flange having ends merging smoothly and seamlessly with the back ends of said ramp side flanges.

3. A dust pan made by stamping from a single piece of sheet metal, said dust pan including a dirt-receiving pocket having a flat bottom adapted to rest flatly on the floor and smooth walls surrounding said bottom from all four sides thereof, and merging smoothly and seamlessly therewith, an inclined ramp merging smoothly and seamlessly with the front and side walls of said dirt-receiving pocket and terminating in a floor-contacting lip, a horizontally extending flange provided along the back wall of said pocket and merging seamlessly therewith, said flange being adapted to be used as a handle for the dust pan, said ramp and said horizontally extending flange lying in said substantially parallel planes.

RICHARD B. LAWRENCE.

References Cited in the file of this patent

UNITED STATES PATENTS

| Number | Name | Date |
|---|---|---|
| D. 24,262 | Stewart | Apr. 30, 1895 |
| D. 35,530 | Gray | Dec. 31, 1901 |
| 354,600 | Hemenway | Dec. 21, 1886 |
| 407,133 | Spurgin | July 16, 1889 |
| 561,917 | Rothrock | June 9, 1896 |
| 633,787 | Brown | Sept. 26, 1899 |
| 735,565 | McCarthy | Aug. 4, 1903 |
| 1,238,860 | Williams et al. | Sept. 4, 1917 |
| 1,404,466 | Miller | Jan. 24, 1922 |
| 1,940,546 | Hower | Dec. 19, 1933 |
| 2,122,948 | Padelford et al. | July 5, 1938 |
| 2,250,450 | Faber | July 29, 1941 |
| 2,251,433 | Wareham | Aug. 5, 1941 |
| 2,455,695 | Monaco | Dec. 7, 1948 |
| 2,496,735 | Malone | Feb. 7, 1950 |

FOREIGN PATENTS

| Number | Country | Date |
|---|---|---|
| 435,142 | France | Dec. 16, 1911 |